US006834805B2

(12) United States Patent
Dvorkis et al.

(10) Patent No.: US 6,834,805 B2
(45) Date of Patent: Dec. 28, 2004

(54) OPTICAL SCANNER WITH SEGMENTED COLLECTION MIRROR

(75) Inventors: Paul Dvorkis, Stony Brook, NY (US); Edward Barkan, Miller Place, NY (US); Howard Shepard, Great River, NY (US); David Tsi, Stony Brook, NY (US); Mark Drzymala, Commack, NY (US); Harold Charych, East Setauket, NY (US); Raj Bridgelall, Mt. Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/050,625

(22) Filed: Jan. 16, 2002

(65) Prior Publication Data

US 2002/0060245 A1 May 23, 2002

Related U.S. Application Data

(62) Division of application No. 09/047,011, filed on Mar. 24, 1998, now Pat. No. 6,382,513, which is a continuation-in-part of application No. 08/912,147, filed on Aug. 15, 1997, now Pat. No. 5,859,417, which is a continuation of application No. 08/405,585, filed on Mar. 17, 1995, now abandoned, which is a continuation-in-part of application No. 08/268,982, filed on Jun. 30, 1994, now Pat. No. 5,742,038, which is a continuation-in-part of application No. 08/314,519, filed on Sep. 28, 1994, now Pat. No. 5,506,392, which is a division of application No. 08/109,021, filed on Aug. 19, 1993, now Pat. No. 5,352,922, which is a division of application No. 07/735,573, filed on Jul. 25, 1991, now Pat. No. 5,278,397.

(51) Int. Cl.[7] ................................................ G06K 7/10
(52) U.S. Cl. ................................ 235/462.2; 235/462.23
(58) Field of Search .......................... 235/467.2, 467.21, 235/467.23, 467.24, 267.08, 467.09, 467.1, 467.11

(56) References Cited

U.S. PATENT DOCUMENTS 3,051,051 A   8/1962   Jeffree
3,396,344 A   8/1968   Broom (List continued on next page.)

FOREIGN PATENT DOCUMENTS

DE      3602008      7/1987
EP      0 249 713    12/1987

(List continued on next page.)

OTHER PUBLICATIONS

"Quick Check 500" Brochure, Photographic Sciences, 2 pages, 1989.

(List continued on next page.)

*Primary Examiner*—Karl D. Frech
(74) *Attorney, Agent, or Firm*—Watts Hoffmann Co., LPA (57) ABSTRACT

A multiple working range scanner includes a collection mirror which is segmented, with each segment having differing optical properties, such as focal length, optical axis, and so on. Differing segments or combinations of segments deal with reflected light received at differing working ranges, and direct it to a photodetector. In another embodiment, beam shaping may be applied to an astigmatic laser beam, for example by means of a part-concave mirror, to create an x waist in the beam which is further from the scanner than the y waist. This provides enhanced performance when the scanner is used on a bar code symbol which is not accurately aligned. In order to provide improved optical alignment within a bar code scanner, the collection mirror may be adjustable both in the x direction and in the y direction.

9 Claims, 6 Drawing Sheets

U.S. PATENT DOCUMENTS

| | | |
|---|---|---|
| 3,780,270 A | 12/1973 | Faulkner et al. |
| 3,790,756 A | 2/1974 | Graves et al. |
| 3,871,748 A | 3/1975 | Day |
| 4,199,816 A | 4/1980 | Humphrey |
| 4,360,798 A | 11/1982 | Swartz et al. |
| 4,369,361 A | 1/1983 | Swartz et al. |
| 4,500,776 A | 2/1985 | Laser |
| 4,508,686 A | 4/1985 | Shaber et al. |
| 4,538,895 A | 9/1985 | Higgins et al. |
| 4,555,164 A | 11/1985 | Feinbloom |
| 4,560,862 A * | 12/1985 | Eastman et al. ............ 235/467 |
| 4,570,057 A | 2/1986 | Chadima, Jr. et al. |
| 4,606,660 A | 8/1986 | Bradshaw et al. |
| 4,641,018 A | 2/1987 | Mazumder et al. |
| 4,652,750 A | 3/1987 | Eastman et al. |
| 4,705,939 A | 11/1987 | Ulinski, Sr. |
| 4,721,860 A | 1/1988 | Troendle |
| 4,748,316 A | 5/1988 | Dickson ................... 235/454 |
| 4,777,357 A | 10/1988 | Harada et al. |
| 4,795,281 A | 1/1989 | Ulinski, Sr. et al. |
| 4,820,911 A | 4/1989 | Arackellian et al. |
| 4,822,986 A | 4/1989 | Guthmueller et al. |
| 4,825,048 A | 4/1989 | Poland |
| 4,826,269 A | 5/1989 | Streifer et al. |
| 4,841,129 A | 6/1989 | Tawara et al. |
| 4,860,226 A | 8/1989 | Martin et al. |
| 4,894,790 A | 1/1990 | Yotsuya et al. |
| 4,896,026 A * | 1/1990 | Krichever et al. .......... 235/472 |
| 4,916,298 A | 4/1990 | Raphael |
| 4,933,538 A | 6/1990 | Heiman et al. |
| 4,980,544 A | 12/1990 | Winter |
| 4,992,649 A | 2/1991 | Mampe et al. |
| 5,013,895 A | 5/1991 | Iggulden et al. |
| 5,015,831 A | 5/1991 | Eastman et al. |
| 5,017,765 A * | 5/1991 | Shepard et al. ........ 235/462.27 |
| 5,034,904 A | 7/1991 | Moy |
| 5,047,617 A | 9/1991 | Shepard et al. |
| 5,064,258 A | 11/1991 | Inokuchi et al. |
| 5,067,093 A | 11/1991 | Przybylowicz et al. |
| 5,073,954 A | 12/1991 | Van Tyne et al. |
| 5,081,639 A | 1/1992 | Snyder et al. |
| 5,115,334 A | 5/1992 | Tomita |
| 5,149,949 A | 9/1992 | Wike, Jr. |
| 5,170,277 A * | 12/1992 | Bard et al. ................... 359/210 |
| 5,194,720 A | 3/1993 | Reinnagel et al. |
| 5,200,597 A * | 4/1993 | Eastman et al. ............ 235/455 |
| 5,210,398 A | 5/1993 | Metlitsky ................... 235/462 |
| 5,218,190 A | 6/1993 | Hardesty et al. |
| 5,229,591 A | 7/1993 | Heiman et al. |
| 5,233,170 A | 8/1993 | Metlitsky et al. ........... 235/462 |
| 5,235,167 A * | 8/1993 | Dvorkis et al. ........ 235/462.21 |
| 5,250,791 A | 10/1993 | Heiman et al. |
| 5,254,844 A | 10/1993 | Krichever et al. .......... 235/462 |
| 5,280,161 A | 1/1994 | Niwa |
| 5,291,319 A | 3/1994 | Harris ........................ 359/18 |
| 5,304,788 A | 4/1994 | Metlitsky et al. ........... 235/467 |
| 5,327,451 A * | 7/1994 | Walker et al. ................ 372/98 |
| 5,332,892 A * | 7/1994 | Li et al. ..................... 235/462 |
| 5,378,883 A * | 1/1995 | Batterman et al. ..... 235/462.21 |
| 5,420,411 A * | 5/1995 | Salatto et al. ............... 235/472 |
| 5,438,187 A | 8/1995 | Reddersen et al. ......... 235/462 |
| 5,440,111 A | 8/1995 | Eastman et al. |
| 5,576,529 A * | 11/1996 | Koenck et al. ............. 235/472 |
| 5,591,954 A * | 1/1997 | Spencer ...................... 235/467 |
| 5,640,001 A * | 6/1997 | Danielson et al. .......... 235/472 |
| 5,671,084 A | 9/1997 | Kurtz ......................... 339/362 |
| 5,693,930 A * | 12/1997 | Katoh et al. ................ 235/467 |
| 5,734,153 A * | 3/1998 | Swartz et al. .......... 235/462.21 |
| 5,742,038 A * | 4/1998 | Dvorkis et al. ............. 235/462 |
| 5,859,417 A * | 1/1999 | Dvorkis et al. ............. 359/210 |
| 6,000,617 A * | 12/1999 | Swartz et al. ............ 235/462.2 |
| 6,220,514 B1 * | 4/2001 | Dvorkis et al. ........ 235/462.37 |
| 6,454,167 B1 * | 9/2002 | Barkan et al. ......... 235/462.01 |
| 6,575,368 B1 | 6/2003 | Tamburrini et al. |

FOREIGN PATENT DOCUMENTS

| | | |
|---|---|---|
| EP | 0 385 478 | 9/1990 |
| EP | 0 492 065 | 1/1992 |
| EP | 0 589 361 | 3/1994 |
| JP | 55-88172 | 7/1980 |
| JP | 60-195639 | 3/1984 |
| JP | 61-120283 | 6/1986 |
| JP | 1-93871 | 4/1989 |
| JP | 3-127191 | 5/1991 |
| JP | 0198175 | 8/1991 |
| JP | 6-150039 | 5/1994 |
| WO | WO 93/18478 | 9/1993 |
| WO | WO 94/01835 | 1/1994 |

OTHER PUBLICATIONS

Barkan, Automatic I.D. News, "Author Verifies the Key to Bar Codying Success", (Nov. 1988).

Grabowski, et al., "Code Reading Mechanical Scanning Gun", IBM Technical Bulletin, vol. 5, No. 5 Oct. 1962.

Yamazaki et al, "New Holographic Technology for a Compact POS Scanner," Applied Optics, vol. 29, No. 11 (Apr. 1990).

* cited by examiner

OPTICAL SCANNER WITH SEGMENTED COLLECTION MIRROR

CROSS-REFERENCE TO RELATED APPLICATIONS

This application is a divisional application of and claims priority to U.S. application Ser. No. 09/047,011, filed on Mar. 24, 1998, now U.S. Pat. No. 6,382,513, which is a continuation-in-part application of U.S. application Ser. No. 08/912,147, filed on Aug. 15, 1997, now issued U.S. Pat. No. 5,859,417, which is a continuation application of U.S. application Ser. No. 08/405,585, filed on Mar. 17, 1995, now abandoned, which is a continuation-in-part application of U.S. application Ser. No. 08/268,982, filed on Jun. 30, 1994, now issued U.S. Pat. No. 5,742,038, which is a continuation-in-part application of U.S. application Ser. No. 08/314,519, filed on Sep. 28, 1994, now issued U.S. Pat. No. 5,506,392, which is a divisional application of U.S. application Ser. No. 08/109,021, filed on Aug. 19, 1993, now issued U.S. Pat. No. 5,352,922, which is a divisional application of U.S. application Ser. No. 07/735,573, filed on Jul. 25, 1991, now issued U.S. Pat. No. 5,278,397.

BACKGROUND OF THE INVENTION

Field of the Invention

The invention relates generally to optical scanners, and in particular in some embodiments to scanners having dual or multiple working ranges.

Most optical scanners such as bar code scanners are adapted for use at a particular distance, or a range of distances, from an indicia to be scanned. If the user holds the scanner too close to the indicia, or too far away, the indicia and/or the flying spot beam will not be in focus, and decoding will not be possible.

Such scanners may not be particularly convenient in environments where a series of indicia to be read are presented to the scanner at various distances, and where it is difficult or impossible for the user to alter the distance between the scanner and the indicia. To deal with such situations, attempts have been made to expand the acceptable working range of conventional scanners, to give the user as much leeway as possible, and also to provide multi-distance scanners which can operate, for example, at a first working range or at a second working range according to the user's preference or requirements. One possibility is for the provision of a two-position switch on the scanner, with the scanner operating at a first working distance in a first position of the switch and at a second working distance in a second position. A disadvantage of such scanners is that they require additional moving parts to provide for operation at the two separate working ranges. Such systems are also not "automatic" in the sense that the user has manually to select the correct working range, according to the distance of the current indicia to be read; if the incorrect working range is chosen, a decode will not result.

One of the difficulties that bar code reader designers face when attempting to produce increased working ranges is that the greater the working range, and the greater the range of possible indicia that might be read, the lower tends to be the resultant signal to noise ratio in light that is reflected from the indicia. One approach for dealing with this involves the provision of non-conventional optics, in which the optics associated with either the laser or with the photodetector have two distinct focal points. An example of this is shown in US Patent U.S. Pat. No. 5,332,892, which is commonly assigned with the present application. In the device shown in that document, the two focal points are associated with corresponding circuitry to provide two separate channels of data derived from the scanned bar code. The two channels have differing resolutions. As the working angle and density vary, at least one of the resolutions is likely to be appropriate for sensing all or most of the bar coded data, regardless of the distance of the bar code with respect to the scanner and/or the size or density of the code. The scanning beams of bar code readers are typically derived from laser diodes. Such diodes are robust and relatively inexpensive, but they do suffer from the disadvantage that the beam emerging from a laser diode is astigmatic. The astigmatic laser diode can be characterised as having two apparent light sources spaced apart from each other along the optical path. One of the light sources lies in a horizontal plane, appears to be coming from inside the laser diode chip, and has a low angular divergence. The other apparent light source lies in a vertical plane, appears to be coming from a facet of the chip, and has a high angular divergence. The two apparent light sources, which are spaced apart from each other by typically about 20 micrometers, form two beam waists in different planes and in different directions, as measured relative to the planar junction of the chip.

The resultant relatively complex beam profile may need selective shaping before it can efficiently be used in an optical scanner. Some methods of providing such beam shaping are described in our co-pending U.S. patent application Ser. No. 08/268,982, filed Jun. 30, 1994, now U.S. Pat. No. 5,742,038, the teachings of which are incorporated herein by reference.

Yet a further option is to provide a multi-focus lens for the outgoing laser beam, thereby providing that the outgoing laser beam may be focused on an object in a first predetermined working range and simultaneously on a second object in a second predetermined working range. Details are disclosed in our co-pending patent application Ser. No. 08/829,718 filed Mar. 31, 1997, the contents of which are incorporated herein by reference.

Where a scanner has several different working ranges, a further difficulty arises in that reflected light from a bar code at the far working range will tend to be much weaker than light reflected from a bar code in the near working range. This makes automatic gain control of the signal difficult. One approach to this problem is shown in U.S. Pat. No. 5,591,954, to Spencer. Spencer discloses a retro-reflective arrangement in which common segmented mirrors are used both for scanning and for the collection of reflected light. Different segments are coated differently, in an effort to equalise the returned light intensity.

A further common difficulty with bar code scanners, particularly with scanners in which the y dimension of the scanning beam is greater than the x dimension, is that the y dimension can be too tall close to the scanner, so reducing the ability of the scanner to read high-density symbols when the symbol is not accurately aligned. In particular, difficulties can occur when the longer axis of the beam cross-section is not parallel with the bars and spaces in the symbol to be read. This problem can be reduced by decreasing the vertical dimension of the laser aperture, but this can sometimes be unacceptable since it results in the loss of laser power.

It is well known that it is advantageous to focus the laser beam, in a bar code scanner, so that it is taller than it is wide. The tall spot reduces speckle and paper noise by increasing the overall spot area, and helps to filter out small printing defects. The width of the spot, on the other hand, is determined by the performance requirements of the scanner. The width is normally chosen so that it is small enough to resolve the smallest elements in a bar code symbol which the scanner is required to read.

Various means of creating elongate laser spots have been used. One is shown in U.S. Pat. No. 5,440,111 to Eastman. This system orients the laser so that the laser's astigmatism causes the spot to be narrower in the direction of spot motion (the x direction) than it is in the direction perpendicular to the direction of motion (the y direction). The amount of elipticity of the laser spot, in this system, is dependent on the amount of astigmatism that the laser has, and by the magnification of the focusing system.

SUMMARY OF THE INVENTION

OBJECTS OF THE INVENTION

It is an object of the present invention at least to alleviate the problems of the prior art.

It is a further object to enhance the performance of scanners having multiple working ranges.

It is yet a further object to provide a scanner with improved reading characteristics when the symbol to be read is presented in an orientation which is not ideal.

It is a further object to reduce the costs of manufacturing a scanner having parts in accurate optical alignment.

FEATURES OF THE PRESENT INVENTION

According to a first aspect of the present invention there is provided an optical scanner for reading indicia comprising:

(a) a beam generator and scanner for producing a scanning light beam and directing said light beam toward an indicia to be read;

(b) a light detector; and (c) a collection mirror for receiving reflected light, the collection mirror having at least first and second segments of differing optical properties whereby said first segment reflects toward the detector light received from an indicia at a first working range from the scanner and said second segment reflects toward the detector light received from an indicia at a second, different, working range.

Such an arrangement improves scanner performance via the collection mirror which is composed of two or more separate segments. Each segment preferably has a different optical surface, such as a difference in focal length, surface orientation, aberration or surface definition (for example, paraboloid rather than spherical). At least one segment directs light back to the photodetector from an indicia which is at a first working distance. At least another segment directs light back to the photodetector from an indicia which is at a second working distance. The segments may operate independently, so that one segment operates only at the first working distance and the other operates only at the second working distance. Alternatively, one segment may operate only at the first working distance, while the second returns light from indicia both at the first and the second working distances. Alternative arrangements may be envisaged in which there are more than two segments.

The segments are preferably contiguous with one another, and may be integrally molded. In one embodiment, the segments are adjacent to one another, and in another one segment surrounds the second in a coaxial fashion.

Maximum signal strength may be achieved, and automatic gain control simplified, where both mirror segments collect light from an indicia at a far working distance, but only one of them collects light from an indicia at a near working distance.

In laser bar code scanners, the size of field of view is critical to the scanner performance, especially under strong ambient light conditions. Reducing the field of view angle will typically improve performance, but optical alignment during manufacture becomes more difficult and labor intensive.

According to the present invention, this difficulty is solved by providing the collection mirror with a field of view angle adjustment, allowing accurate alignment of the mirror with the other optical components within the scanner. Preferably, the mirror may be adjusted in angle both in the x and y axis directions. Ideally, x and y axis translation of the mirror is also possible.

An adjustable mirror of this type may be used in conjunction with the optical scanner previously described, or may be used independently.

A collection mirror of this type having both x axis and y axis angular adjustment can align the field of view angle of the receiving optics to the laser beam axis with very high accuracy. Assuming that the x and y angular adjustments are independent of each other, the total system field of view angle may typically be controlled to within about plus or minus 2°.

According to a further aspect of the present invention there is provided an optical scanner for reading indicia by effecting a scanning motion of a light beam in an x-axis direction across an indicia to be read, said scanner comprising:

(a) a laser for producing a light beam of non-circularly-symmetric cross-section having an x-axis and a y-axis, beam divergence in the x axis being greater than beam divergence in the y axis;

(b) negative beam-shaping optics in the beam for adjusting the y axis divergence independently of the x axis divergence.

Such an arrangement improves scanner performance, particularly in the reading of bar code symbols which are not accurately aligned along the scanning (x) axis. In this invention the laser has been rotated so that its wider divergence angle is horizontal (in the x axis direction). the beam height (y) at the laser aperture is quite small. The vertical (y) dimension of the aperture can therefore be reduced without sacrificing laser power.

It is also not necessary, in contrast with the prior art such as the above-mentioned Eastman Patent U.S. Pat. No. 5,440, 111, to use higher magnification to increase the separation between the x and y waists in the beam. In the present invention, the spacing between the waists is controlled not by magnification, but by the negative optical element in the laser path. Adequate waist separation is possible even with lower magnification systems.

The negative optical element in the laser path is preferably cylindrical or part-cylindrical, thereby allowing independent control of the y-axis dimension of the beam cross-section. Preferably the optical element comprises a part-cylindrical mirror having a longitudinal axis which is horizontal (in the x-axis direction). In the preferred embodiment, the cylindrical element is molded into a plastic fold mirror. This is a standard element in most scanning systems in any event, so the invention adds very little extra cost. There is also no additional loss of optical output power as would occur if an additional lens were to be added to the system.

The invention is particularly although not exclusively useful in connection with index guided lasers, in which astigmatism is typically rather lower than is the case with gain guided lasers. Previously, gain guided lasers have been preferred in this type of application, for the very reason that their astigmatism is typically higher which results in greater separation between the x and y waists of the focused beam. This is important because if the waists were close together, the spot area would be very small near the waist resulting in a noisy signal in this area. Separating the waists helps to avoid this.

The present invention opens up this field to the use of index guided lasers. It further provides simplification, in that adjustment between the x and y waists may now be achieved without change in magnification.

BRIEF DESCRIPTION OF THE DRAWINGS

The invention may be carried into practice in a number of ways and several specific embodiments will now be described, by way of example, with reference to the accompanying drawings, in which.

DETAILED DESCRIPTION OF THE PREFERRED EMBODIMENTS

Figure 1:
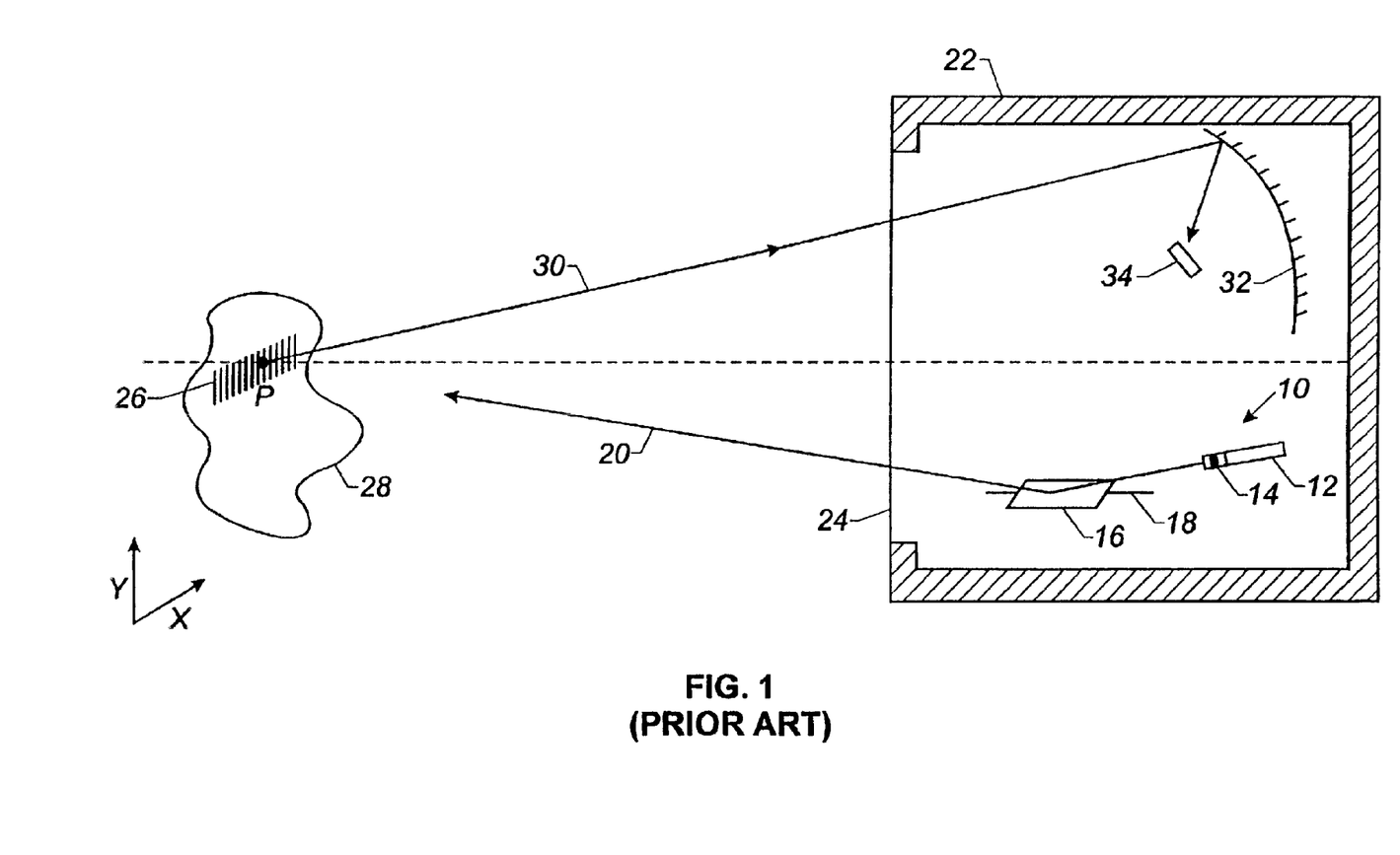
FIG. 1 illustrates a prior art scanner.

FIG. 1 illustrates schematically one specific variety of optical or bar code scanner.

A laser diode assembly 10 including a laser diode 12 and beam-shaping optics 14 creates a shaped laser beam which impinges upon an oscillating mirror 16, mounted for oscillatory movement about an axis 18, to create an outgoing scanning beam 20. The outgoing scanning beam leaves the scanner housing 22 via a window 24, and is directed toward a bar code symbol or other indicia 26 to be read. The bar code symbol is printed or otherwise attached to a substrate 28. The scanning beam 20 creates a "flying spot" P which moves across the substrate and consequently across the bar code to be read.

Light 30 reflected from the bar code returns via the window 24 where it is collected by a collection mirror 32 and directed toward a photodetector 34. The photodetector provides an output electrical signal (not shown) from which the relative width of the bars and spaces in the code may be determined. From this information, the bar code symbol may be decoded to recover the information that it contains.

One disadvantage of this type of bar code scanner is that it has a limited working range. If the bar codes symbol is positioned too close to the scanner housing, or too far away, the signal to noise ratio typically becomes too high and the bar code symbol cannot easily be decoded.

Figure 2A:
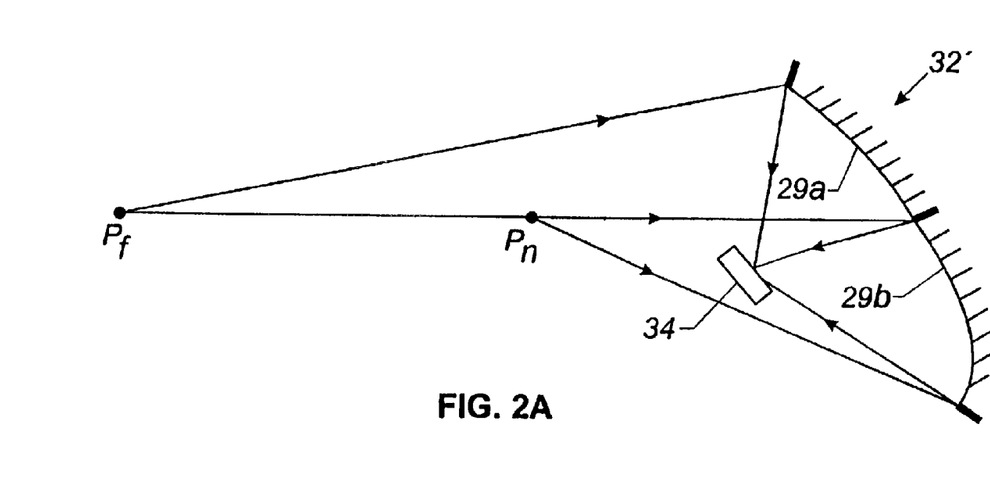
FIGS. 2a and 2b represent alternative embodiments of the invention in which the collection mirrors are segmented.
Figure 3A:
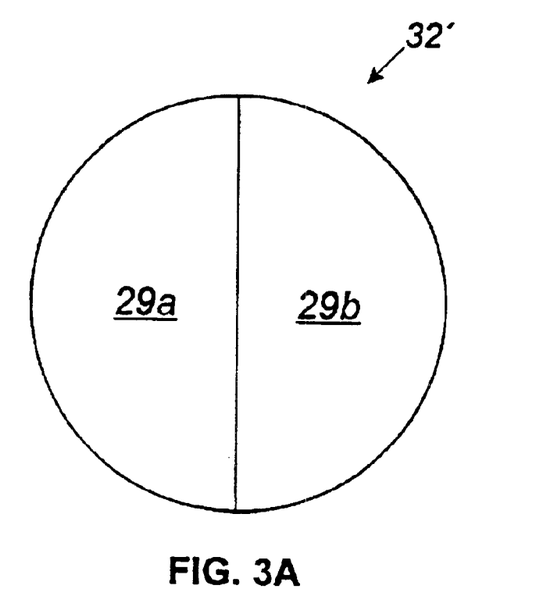
FIGS. 3a and 3b show the collection mirrors of FIGS. 2a and 2b respectively in more detail.

FIG. 2a illustrates an improvement, embodying the present invention, to the scanner of FIG. 1. In the arrangement of FIG. 2a the collection mirror 32 is replaced by a two-section collection mirror 32', having a first section 29a and a second section 29b. FIG. 3a shows the collection mirror 32' from the front.

The mirror sections 29a,29b have differing profiles such that an object $P_f$ placed at a far working distance is imaged by the section 29a, while an object $P_n$ placed at a near working distance is imaged by the section 29b. More generally, the section 29a is responsible for objects within a far working range, whereas the section 29b is responsible for objects within a near working range.

The mirror segments 29a,29b have differing optical surfaces. They will typically have differing focal lengths, but they may also or alternatively have differing surface orientations, aberrations, or surface definitions (paraboloid instead of spheroidal for example).

Figure 2B:
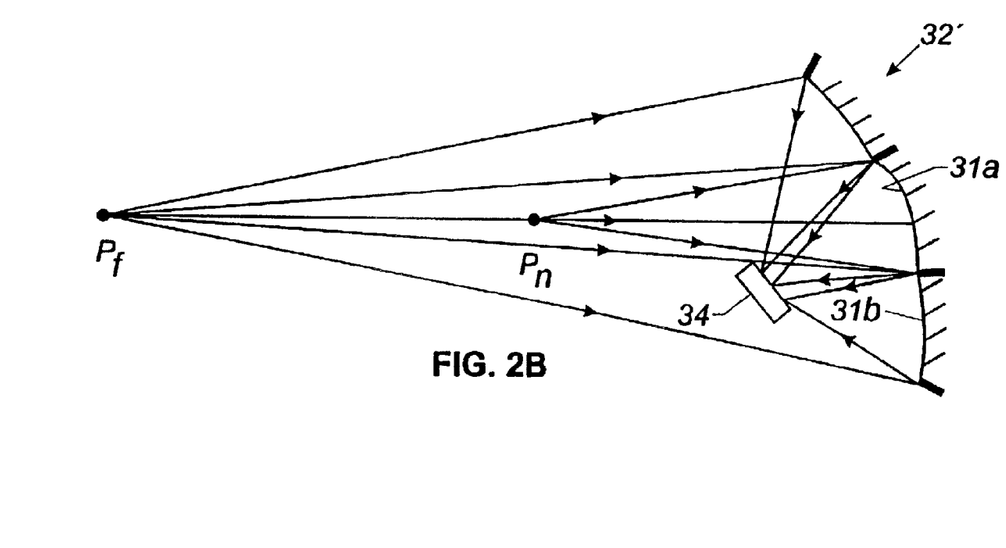

Another embodiment of the invention is shown in FIG. 2b. Here, the collection mirror has a coaxial configuration, best seen in FIG. 3b, and includes an inner circular segment 31a and an outer annular segment 31b. In this embodiment, both of the mirror segments collect light received from a far object $P_f$, and direct it towards the photodetector 34. Since the two segments once again have differing optical characteristics, for example differing focal lengths, not all of the light received from $P_f$ will focus at exactly the same point, but as shown in the drawing, all of it can be received by the photodetector by virtue of the photodetector's size. Some of the light received may be focused on one point of the photodetector, and some on another, but in both cases the photodetector receives a signal. Light received from a near object $P_n$ is reflected towards the photodetector solely by the inner segment 31a. Such an arrangement provides for maximum signal when the scanner is operated at its far working range. The increase in signal at the far range due to the segment 31b tends to balance out the loss of light consequent upon the inverse square law, thereby allowing easier automatic gain control of the signal at both the near and the far working ranges.

Figure 3B:
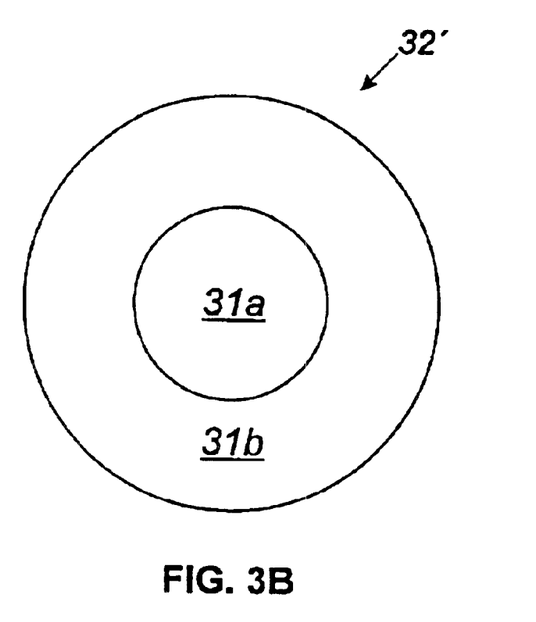

The segments 31a, 31b may differ by means of focal length, surface orientation, aberrations or surface definition (paraboloid for example, rather than spherical).

It will be understood that alternative topologies are possible, in addition to the arrangements described. Additional segments could be provided, for example, to allow for multiple working ranges. The mirror shape may be rectangular or square, rather than circular. The segments need not be contiguous. Both segments in FIG. 3a could return light from an object in the far working range, with only one of them returning light from the near working range. Each of the segments illustrated in FIG. 3b may return light from only one of the near working range or the far working range, but not both. The same concepts may be applied to retroreflective scanners, in which the collection mirror is oscillated with a portion of the mirror serving to reflect the outgoing laser beam, as well as collecting the incoming reflections. Other configurations will occur to the skilled man.

In laser bar code scanners the size of the field of view is critical to scanner performance especially when the scanner is to be used under strong ambient light conditions. Reducing the field of view angle improves performance but makes optical alignments of the various components much more difficult and labor intensive at the manufacturing stage. The problem can be alleviated by arranging for the collection mirror to be adjustable in position and/or angle.

Figure 4:
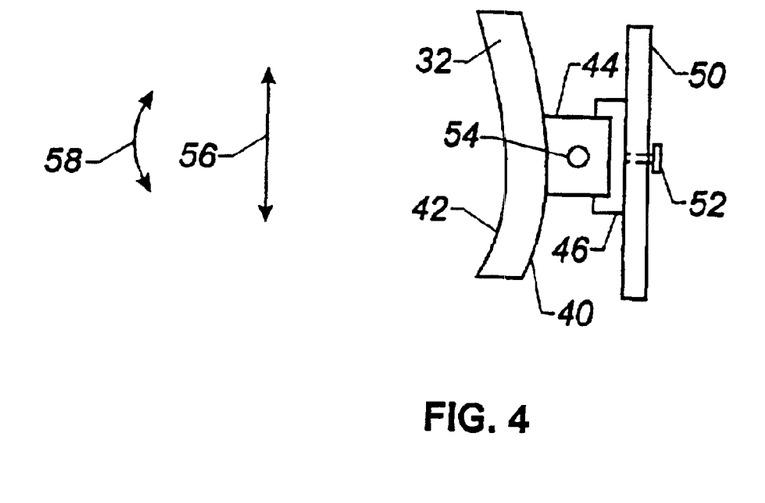
FIG. 4 illustrates an adjustment mechanism for a collection mirror.

One example of an adjustable collection mirror 32 is given in FIG. 4. The mirror 32 has a rear surface 40, opposite its reflecting surface 42, to which is attached a mirror mount 44. The mirror is adjustable in angle, as shown in the arrows 58, by rotation about the pivot axis 54. Translation of the mirror in the directions shown by the double-headed arrow 56 is also provided for. To that end, the mount 44 is secured to a sliding mount 46 which can slide along a fixed bar 50. A locking nut is provided at 52.

A similar arrangement (not shown) may allow the mirror to rotate and to be translated in a perpendicular direction from that shown in FIG. 4. Since both positional and angular adjustments can be made independently of each other, the total system field of view angle can be controlled very accurately, typically to within about plus or minus 2°.

It is well known that it is advantageous to focus the laser beam, in a bar code scanner, so that it is taller than it is wide. The tall spot reduces speckle and paper noise by increasing the overall spot area, and helps to filter out small printing defects. The width of the spot, on the other hand, is determined by the performance requirements of the scanner. The width is typically chosen so that it is small enough to resolve the smallest elements in a bar code symbol which the scanner is required to read. Before discussing a further embodiment having an improved beam profile, reference should first be made to FIG. 5 which illustrates the terminology that will be used.

Figure 5:
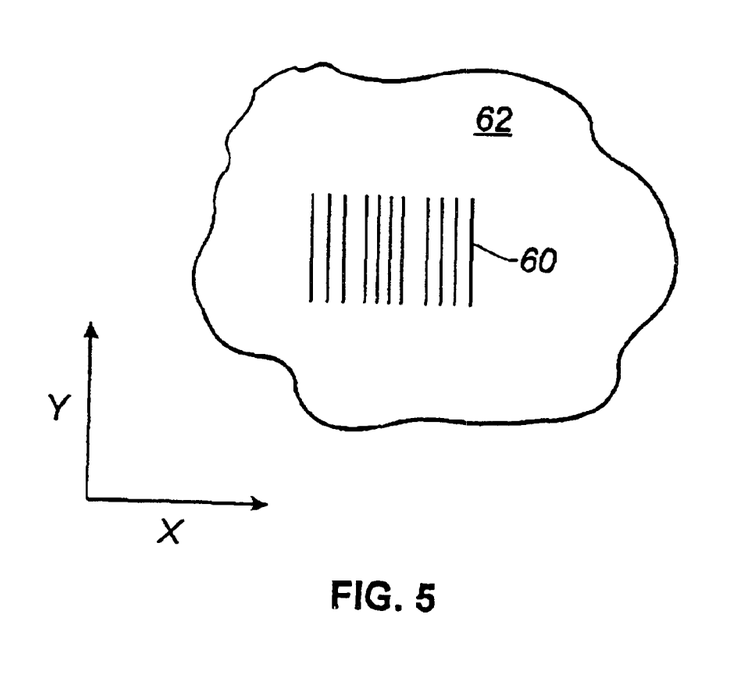
FIG. 5 identifies the x and y axes to be used throughout this specification and claims.

FIG. 5 shows a front view of a typical bar code symbol 60 on a substrate 62. The x and y axes, to be referred to below, are defined as shown, with the x axis extending longitudinally of the bar code, and the y axis generally parallel to the lines. More generally, the x axis is defined as the direction parallel to which the bar code symbol is scanned, for example parallel to the direction of motion of a "flying spot". When a two-dimensional bar code or other indicia is to be captured, scanning may be carried out by means of a raster pattern over the indicia comprising a plurality of parallel scan lines in the x direction, the lines being spaced apart from one another in the y direction.

Similar x and y axes may be applied to the outgoing laser beam both before and after it has impinged upon the oscillating mirror or other scanning element. Of course, since the outgoing laser beam may be reflected and bent several times before it leaves the scanner, the x axis, applied to the cross-section of the beam, will not necessarily be coincident in direction with the x axis shown in FIG. 5. Nevertheless, the x axis when applied to the beam cross-section can be defined, at any point, as that axis which will, after all appropriate reflections have been completed, map onto the x axis shown in FIG. 5 when the beam impinges upon the indicia to be read. A similar rule applies to the y axis.

Figure 6:
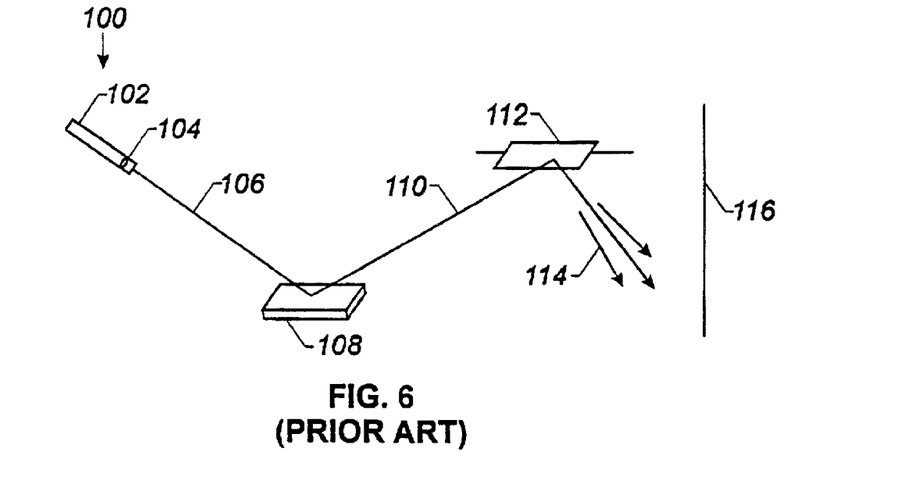
FIGS. 6 and 7 show how the beam profile varies in one previously known scanner.
Figure 7:
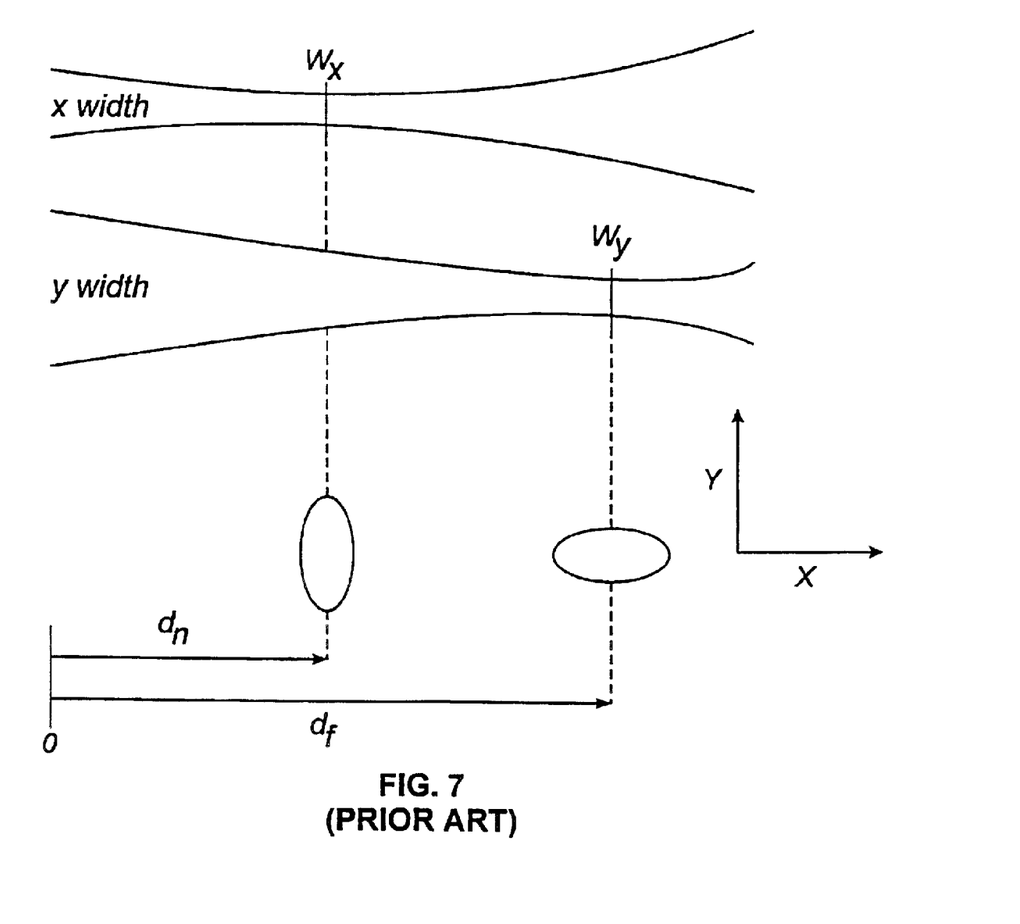

With those definitions in mind, we can now turn to FIGS. 6 and 7 which illustrate a prior art scanner which incorporates beam shaping. The scanner includes a laser diode assembly 100 having a laser diode 102 and beam shaping optics 104. The laser diode 102 is a gain guided laser having high astigmatism so that the beam fans out much more in one direction than in the other. In the device shown, the laser is aligned so that the beam fans out in the y direction. The beam shaping optics 104 includes a cylindrical element to shape the beam. The shaped beam 106 is reflected from a planar fold mirror 108, and the resultant reflected beam 110 is then further reflected from a scanning mirror 112 to produce a scanning outgoing beam 114. This leaves the scanner housing (not shown) via a window 116.

FIG. 7 schematically illustrates the beam profile on the far side of the window 116. The upper traces represent the beam width in the x direction, at various distances from the window, and the lower traces the y width. As may be seen, the beam has an x waist $W_x$ at a relatively close distance $d_n$, and has a y waist $W_y$ at a further distance $d_f$.

Such an arrangement has one drawback, in that the y dimension of the beam can be too tall close to the scanner, reducing the ability of the scanner to read high density symbols when the scan line (which is normally in the x direction) is not exactly perpendicular to the bars and spaces in the symbol. This problem can be reduced by decreasing the vertical dimension of the laser aperture, within the optical assembly 104, but this also reduces the laser power. Sometimes, the loss of laser power may be unacceptable.

Figure 8:
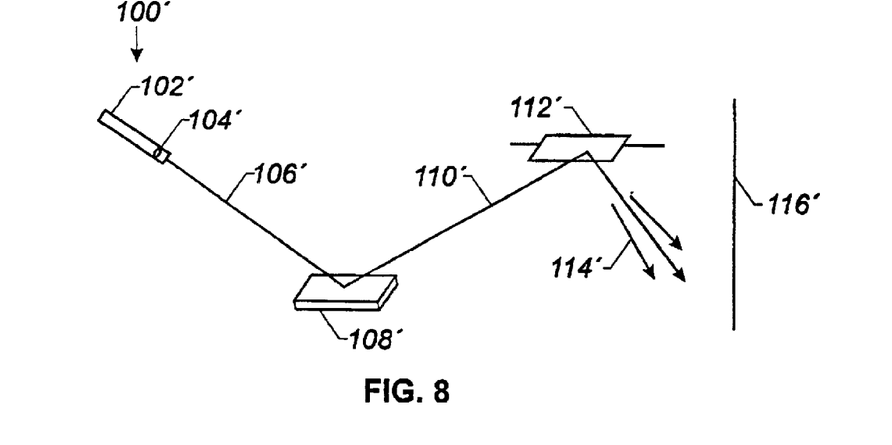
FIGS. 8 and 9 show how the beam profile varies in a further embodiment of the present invention.

A new approach is shown in the embodiment of FIG. 8. Here, a laser diode assembly 100' includes a laser diode 102' and an optical assembly 104'. The laser 102' is astigmatic, and may be either a gain guided laser or an index guided laser. The laser is positioned so that the unmodified beam tends to fan out in the x direction (in other words, the laser is rotated through 90° from that shown in FIG. 6).

In this embodiment, the laser optics 104' need not incorporate any cylindrical optical elements. Instead, a naturally flattened beam 106' impinges upon a stationary fold mirror 108', from which it is reflected at 110' toward the scanning mirror 112'. The fold mirror 108' is part-cylindrical and acts as a negative (concave) cylindrical optical element in the laser path. The cylinder's axis is in the x direction, parallel to the wide divergence angle of the laser.

Figure 9:
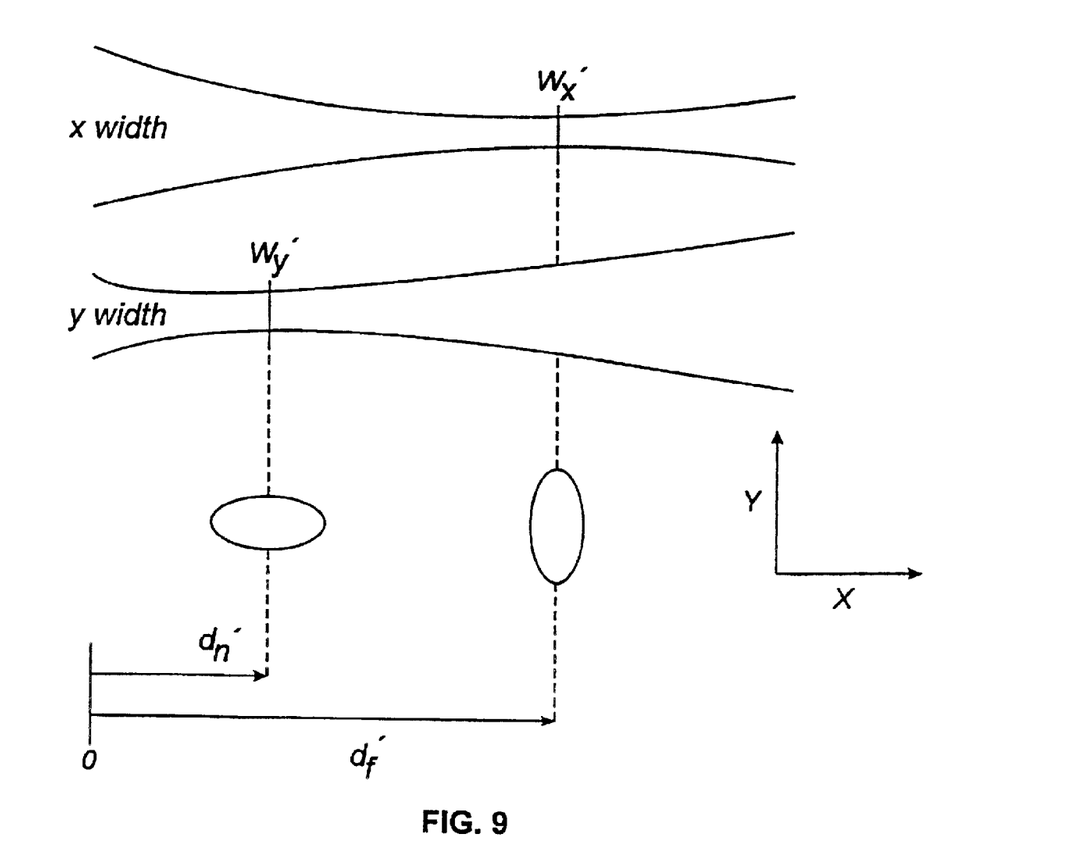

Such an arrangement modifies the outgoing scanning laser beam 114' so that, on the far side of the scanner window 116', it is shaped as shown in FIG. 9. The negative optical element 108' moves the y waist $W'_y$ closer to the scanner, separating it from the x waist $W'_x$ which is further out. Such an arrangement largely eliminates the problem of limited roll tolerance that results from a laser spot that is too tall close to the scanner. When the laser is rotated so that its wider divergence lies along the x axis, the beam height at the laser aperture is quite short. The vertical dimension (the y axis) of the aperture can therefore be reduced without sacrificing laser power.

In alternative arrangements, the fold mirror 108' could be replaced with any other appropriate means for introducing a negative non-rotationally symmetric optical element into the laser's path. For example, the scanning mirror 112' could be part-concave; alternatively, a negative cylindrical lens or other optical element could form part of the optical assembly 104'. A similar effect could be achieved by means of one or more holographic optical elements.

It will be appreciated of course that any two or more of the features described in the various embodiments may be combined, as desired, within a single scanner. For example, the adjustable collection mirror illustrated in FIG. 4 could be used in conjunction with the arrangements of FIG. 2, or even with the otherwise lone arrangement of FIG. 1. All of the concepts are applicable for use in "staring type" scanners, in which the collection mirror is stationary, and in "retro-reflective" scanners, in which the collection mirror itself oscillates and acts not only to collect the received light but also acts as the scanning element.

While the invention has been illustrated as described with reference to a number of particular embodiments, it is not intended to be limited to any of the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. Accordingly, such adaptations should be and are intended to be comprehended within the meaning and range of equivalence of the following claims.

What is claimed is:

1. An optical scanner for reading indicia by effecting a scanning motion of a light beam in an x-axis direction across an indicia to be read, said scanner comprising:
   (a) a laser for producing an unmodified light beam of non-circularly-symmetric cross-section, having an x-axis and a y-axis, beam divergence in the x axis being greater than beam divergence in the y axis;
   (b) negative beam-shaping optics in the outgoing beam path for adjusting the y axis divergence independently of the x axis divergence.

2. An optical scanner according to claim 1 wherein the beam-shaping optics comprises a concave part-cylindrical mirror.

3. An optical scanner according to claim 2 wherein said mirror defines the mirror axis, said mirror axis lying in the x axis direction.

4. An optical scanner according to claim 1 further comprising beam-shaping optics in the beam for equally adjusting the x and y axis divergence.

5. An optical scanner according to claim 1 wherein the laser is a gain guided.

6. An optical scanner according to claim 1 wherein the laser is an index guided laser.

7. An optical scanner according to claim 1 wherein the beam has an x-waist, at which its x axis dimension is least, and a y-waist, at which its y axis dimension is least, said x waist being located further from the scanner than the y waist.

8. An optical scanner according to claim 7 wherein the negative beam-shaping optics adjusts the spacing between the x and y waist without change in overall magnification.

9. An optical scanner for reading indicia by effecting a scanning motion of a light beam in an x-axis direction across an indicia to be read, said scanner comprising:
   (a) a laser for producing a light beam of non-circularly-symmetric cross-section, having an x-axis and a y-axis, beam divergence in the x axis being greater than beam divergence in the y axis, and wherein the beam has an x-waist, at which its x axis dimension is least, and a y-waist, at which its y axis dimension is least, said x waist being located further from the scanner than the y waist;
   (b) negative beam-shaping optics in the beam path for adjusting the y axis divergence independently of the x axis divergence without change in overall magnification.

* * * * *